United States Patent [19]
Butts et al.

[11] Patent Number: 5,494,318
[45] Date of Patent: Feb. 27, 1996

[54] SECONDARY CONTAINMENT SYSTEM

[76] Inventors: Nicholas E. Butts, 10 Coveside Drive, Unit 212, Huntsville, Ont, Canada, P0A 1K0; George J. Donovan, 26 Rankin Rd., Newark, Del. 19711; Daniel P. Martin, 220 Briarmeadow St., Victoria, Tex. 77904

[21] Appl. No.: 357,079

[22] Filed: Dec. 15, 1994

Related U.S. Application Data

[62] Division of Ser. No. 55,698, Apr. 29, 1993, abandoned.

[51] Int. Cl.⁶ ............................. F16L 13/02; F16L 47/00; F16L 47/02
[52] U.S. Cl. .................... 285/21 A; 156/304.6; 156/294; 219/535; 285/133.1; 285/138; 285/423
[58] Field of Search ................... 219/535, 544; 156/304.6, 158, 380.2, 294, 272.2, 273.9; 285/21, 133.1, 138, 423, 284, 93

[56] References Cited

U.S. PATENT DOCUMENTS

| | | | |
|---|---|---|---|
| 2,895,512 | 7/1959 | Forsyth et al. | 285/133.1 |
| 2,930,634 | 3/1960 | Merritt | 219/535 |
| 3,378,672 | 4/1968 | Blumenkranz | 156/158 |
| 4,234,781 | 11/1980 | Flink | 156/380.6 |
| 4,770,442 | 9/1988 | Sichler | 219/535 |
| 4,851,647 | 7/1989 | Kuhling | 156/304.3 |
| 4,932,257 | 6/1990 | Webb | 285/21 |
| 5,018,260 | 5/1991 | Ziu | 285/133.1 |
| 5,053,097 | 10/1991 | Johansson et al. | 156/158 |
| 5,087,308 | 2/1992 | Wermelinger | 156/304.6 |
| 5,176,025 | 1/1993 | Butts | 73/40.5 R |
| 5,184,850 | 2/1993 | Wermelinger | 285/21 |
| 5,185,049 | 2/1993 | Bacon | 156/304.6 |
| 5,407,514 | 4/1995 | Butts et al. | 285/21 |
| 5,407,520 | 4/1995 | Butts et al. | 285/21 |
| 5,410,131 | 4/1995 | Brunet et al. | 156/304.6 |
| 5,419,593 | 5/1995 | Greene et al. | 156/294 |
| 5,433,484 | 7/1995 | Ewen et al. | 285/21 |

FOREIGN PATENT DOCUMENTS

| | | | |
|---|---|---|---|
| 1416207 | 12/1965 | France | 219/544 |
| 11997 | 1/1990 | Japan | 285/21 |
| 95845 | 4/1960 | Norway | 285/21 |
| 1737216 | 5/1992 | U.S.S.R. | 285/21 |
| 2237613 | 5/1991 | United Kingdom | 285/138 |

*Primary Examiner*—Eric K. Nicholson
*Attorney, Agent, or Firm*—Foley & Lardner

[57] ABSTRACT

A secondary containment piping system is composed of a plurality of modules of concentric pipe. The inner pipe carries fluid being transported, and the outer pipe provides secondary containment of fluid leaking from the inner pipe. The module consists of a length of inner pipe centred in a length of outer pipe by a series of spiders or ribs, fastened to one or both of the pipes. The ends of both inner and outer pipes are coplanar and perpendicular to the axis of the module. Successive modules are joined by simultaneously welding the inner and outer pipes of one module to the corresponding pipes of an adjacent module, the preferred material for the pipes is HDPE and the welding is accomplished using electric fusion welding techniques.

12 Claims, 8 Drawing Sheets

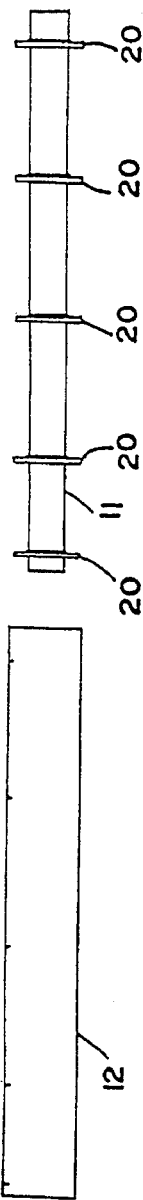
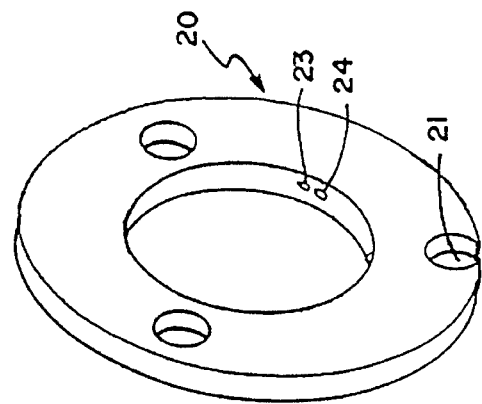
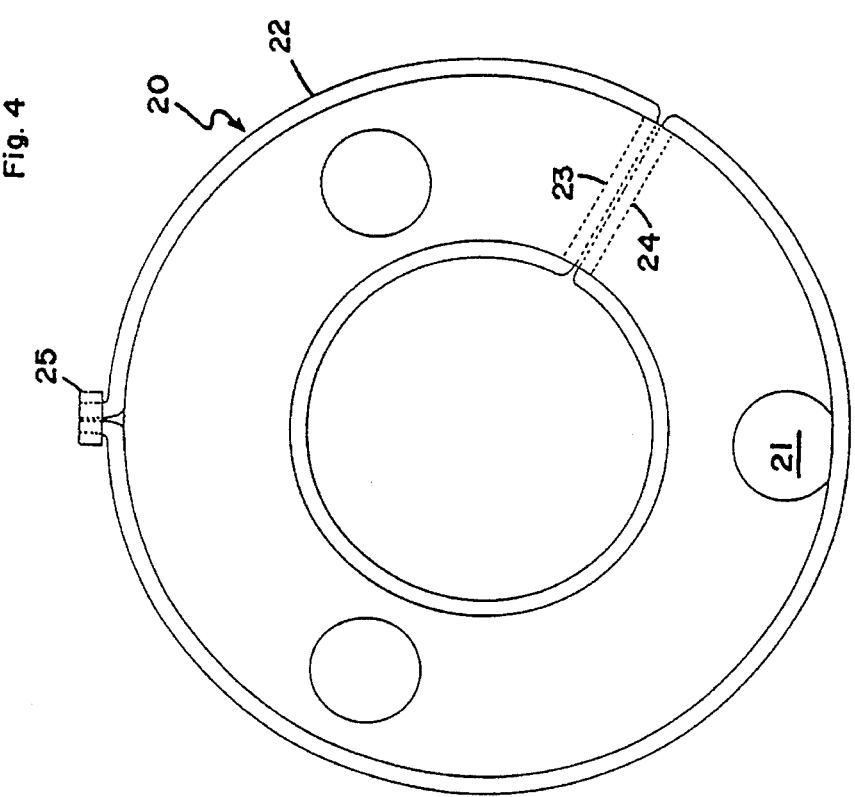
Fig. 4
Fig. 6
Fig. 5

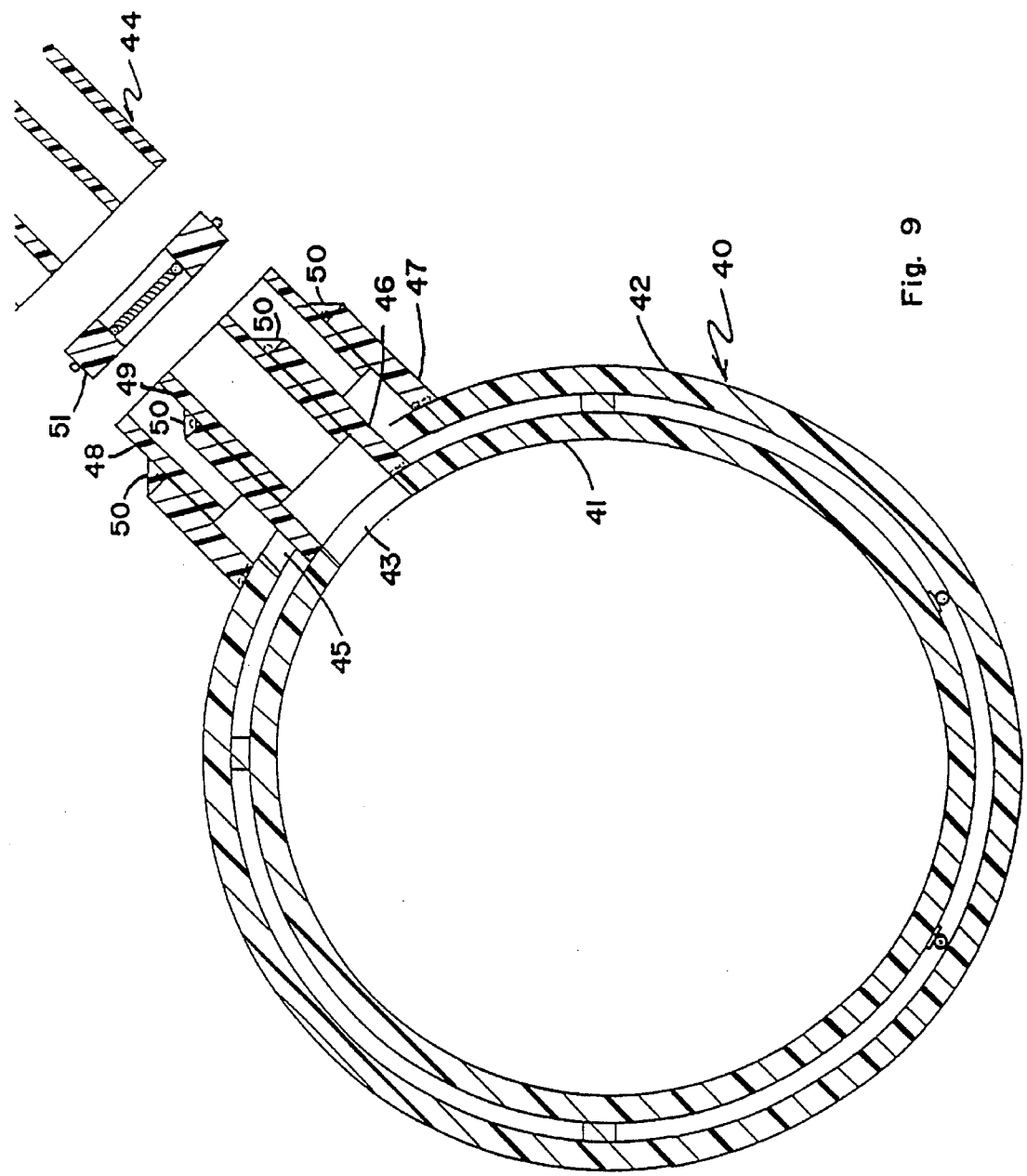

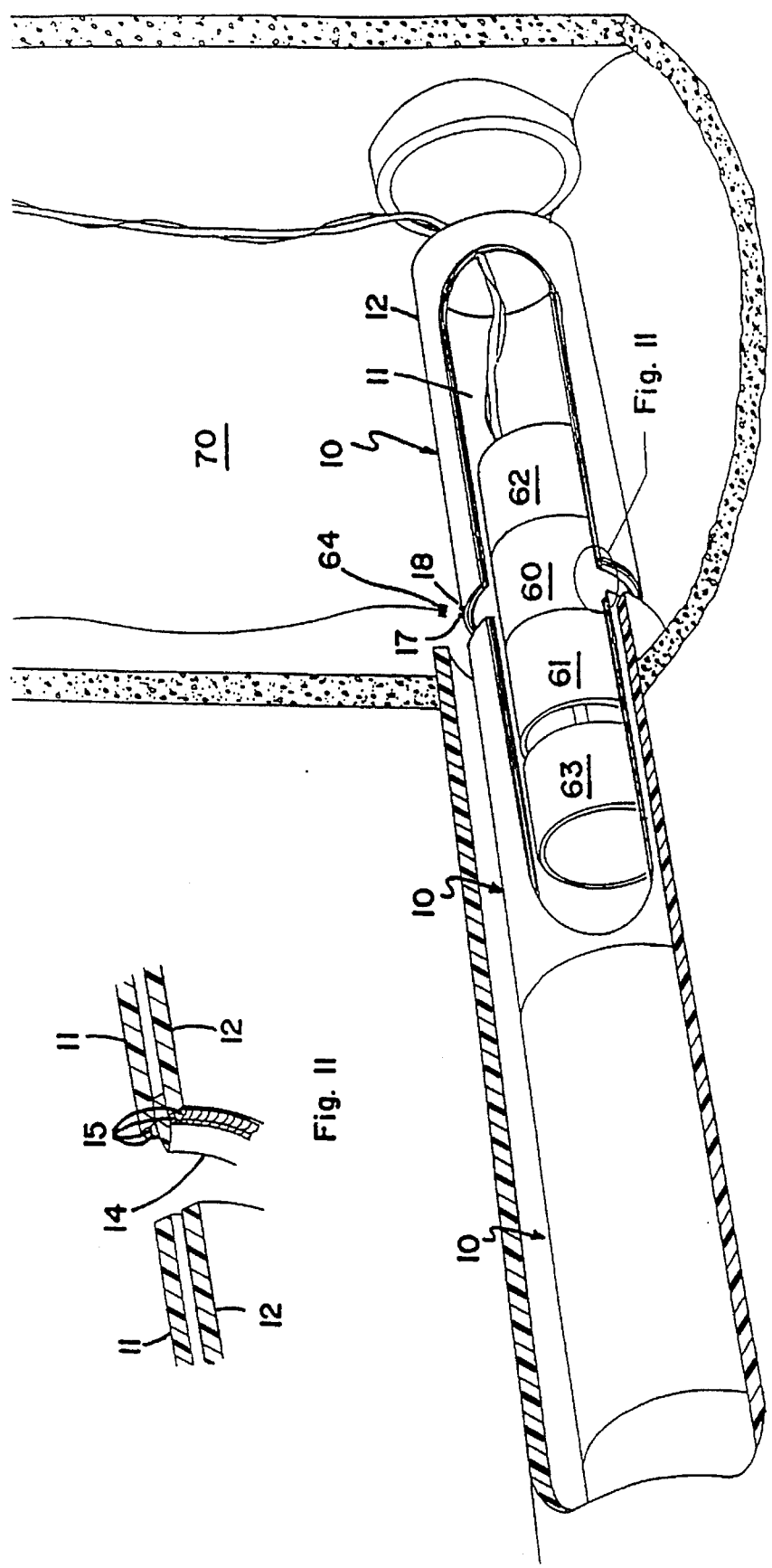

SECONDARY CONTAINMENT SYSTEM

This is a divisional of application Ser. No. 08/055,698 filed Apr. 29, 1993 abandoned.

FIELD OF THE INVENTION

The present invention relates to an improved form of secondary containment piping system for use either as drain-waste-vent (DWV) pipe in laboratories and other locations where hazardous waste can be encountered, or as a sewer relining system for the reconditioning of subterranean sewers through which such effluents are discharged to treatment facilities.

BACKGROUND OF THE INVENTION

It has been determined that heat weldable thermo-formed plastic, and in particular high density polyethylene "HDPE" is the preferred material for secondary containment piping systems for hazardous wastes. HDPE is virtually inert to most hazardous wastes being disposed of and has been accepted as the required material for both the inner carrier pipe as well as the external containment pipe.

In such systems there is a requirement for joining sections of pipe together to like sections and or to appropriate fittings, to create DWV or sewer reline plumbing systems for handling these hazardous effluents.

Butts et al, United States patent application Ser. No. 07/941,662 filed Sep. 8, 1992 (U.S. Pat. No. 5,407,514) the entire subject matter of which is herein incorporated by reference, discloses an improved form of welding rod which can be used to weld members of thermoplastic. This welding rod when used for HDPE members consists of an HDPE core wrapped in a plurality of fine wires, which are embedded in the surface of the core. The welding rod is placed between the members to be joined, pressure is applied and maintained while an electric current is passed through the wires causing melting of the core and the adjacent portions of the members and the pressure is maintained after the current is discontinued until the members are fused together. The said prior patent application also discloses a variety of techniques for welding pipes. These techniques include positioning an annulus of welding rod between the ends to be joined and butting the ends together with the appropriate maintenance of pressure while an electric current is supplied for a sufficient time to cause fusion of the members and the welding rod.

The said application also discloses the use of a fusion ring for forming butt welds between sections of pipe, the fusion ring incorporating an appropriate welding rod element internally, with the ends of the pipe being received in opposite sides of the ring and held in position while the welding rod is heated and fuses with the ends of the pipe to form the completed joint. This fusion ring is formed of a welding rod and a collar surrounding the welding rod, the collar having an inside diameter substantially equal to the outside diameter of the sections to be joined. The fusion ring is positioned between the two sections of pipe as in a socket fitting and the two sections are then welded together while pressure is applied to push the pipes together. The use of the collar is particularly advantageous in situations where containment of the fluid transported in the pipe is a priority. For larger diameter and or thicker walled pipes multiple runs of the appropriate welding rod can be utilized in the collar.

SUMMARY OF THE INVENTION

The present invention provides a significant improvement on the teachings of the prior art, by providing a means for simultaneously butt welding concentric sections of pipes of a secondary containment system whereby the inner carrier pipes and the outer containment pipes are all joined simultaneously.

In one aspect of the invention sections of carrier and containment pipe are prefabricated into modules containing both the inner carrier and the outer containment pipe. These pipes may be maintained in concentric relation by the use of appropriate spacers in the form of spiders of ribs which may be welded to one or both of the pipes to maintain a constant relationship between the two pipes of the prefabricated module.

These prefabricated modules may then be joined to like modules or other fittings by the use of a thick annular ring with at least one welding rod secured to the interior of the ring and connected to a second segment of welding rod secured to the exterior of the ring. The ring has an exterior diameter equal to the interior diameter of the containment pipe and an interior diameter equal to the exterior diameter of the carrier pipe. The ring may thus be engaged between adjacent sections of prefabricated modules such that the ends of each module are in contact with the welding rods positioned at the internal and external periphery of the annular ring, and the pipes of each module joined to the corresponding pipes by a weld formed by an electric current passing through the welding rod with appropriate pressure applied during the heating phase of the welding operation. In simultaneously welding both the inner and outer pipes, a much stronger joint is obtained than would be possible with the basic fusion ring of application 07/91,662 (U.S. Pat. No. 5,407,514), because the annular ring becomes an integral part of the weld in actuality joining all four pipe ends together at one time. In cases where a secondary containment system is used for relining an existing sewer, the inner and outer pipes may be spaced apart only a very small distance, and in that case ribs on the exterior of the carrier pipe would suffice to ensure that the pipes are concentrically aligned, and in place of an annular ring, a thin spline may be used to align the pipe ends. In this case the welding rod an for example be pre-attached to an end of the pipe with the spline inserted in the end, and this end butted to an adjacent module and welded thereto by applying an electrical current while maintaining pressure on the members being welded. Once again in this case a strong joint is created between the adjacent modules with in actuality all four pipe ends being joined together and to the spline.

An alternative technique for aligning the inner and outer pipes in a module where there is a small spacing between the two is to use an externally applied centring device such as a ring with wedge shaped spacing prongs on it, and to inject molten HDPE between the inner and outer pipes to bond the inner and outer pipes together. The centring device can then be removed and the pipes are held in alignment using the plastic injected between them.

In accordance with one form of the invention, a module of a thermoplastic secondary containment piping system is adapted to be joined to like sections to form a system for transporting fluids. Each module comprises an inner carrier pipe formed of the thermoplastic and an outer containment pipe also of the same plastic. Optionally a plurality of spiders of this same thermoplastic are adapted to hold the carrier pipe concentrically in the containment pipe. The spiders may have openings are required for the passage of leaking fluid and detection means there through. The spiders may be welded at least to the carrier pipe. In the module thus formed the ends of the carrier and containment pipes are faced perpendicular to the axis of the pipes with the ends of the pipes being coplanar. Like pipe sections may thus be joined by simultaneously welding the sections of carrier pipe and the section of sections of containment pipe to like sections or to an intermediate member such as a plumbing fitting.

The invention also comprehends a means for welding together adjacent sections of a secondary containment piping system as described above which comprises using an annular ring having flat sides and an internal diameter to receive the exterior surface of the carrier pipe in a sliding fit, and an outer diameter to receive the inner surface of the containment pipe in a sliding fit. A welding member is affixed to the inner and outer surfaces of the annular ring intermediate the flat faces thereof to engage the ends of the adjacent pipe sections when butted up against the welding rod whereby welding of the pipes to form the system is enabled.

The present invention also includes within its scope a welding means as described above wherein the welding member is a rod of the same material as the pipe sections, wrapped in an electrical winding whereby the welding rod and the adjacent portions of the pipe sections are brought to fusion temperature by the application of an electric current to the electrical winding and with pressure applied the pipe sections are welded to the annular ring.

The present invention further comprises a method of welding concentric sections of thermoplastic pipe which comprises aligning the ends of the concentric pipes in a plane perpendicular to the axis of the pipes, interposing between the ends of the section a flat ring having an interior diameter equal to the exterior diameter of the interior pipe and an exterior diameter equal to the interior diameter of the exterior pipe and providing a ring of welding rod on the interior and exterior diameters of the ring, inserting the ring into the annular space between the interior and exterior pipes and heating the welding rod to weld the ring to the pipe end.

BRIEF DESCRIPTION OF THE DRAWINGS

In the accompanying drawings;

FIG. 4 is a side view of a module of drain waste vent (DWV) pipe with the exterior containment pipe removed from the interior carrier pipe, FIG. 5 is a plan view of a spider for welding adjacent pipe sections, FIG. 6 is a perspective view of a spider for spacing adjacent pipe sections, FIG. 9 is a transverse section through a pipe section in accordance with FIG. 1 showing an adaptor for connecting to a module of concentric pipe in accordance with FIG. 7, FIG. 10 illustrates the formation of a weld between adjacent modules utilizing pneumatically controlled equipment, FIG. 11 is a partial section of the module of FIG. 10 illustrating the spline connection.

DETAILED DESCRIPTION OF THE PREFERRED EMBODIMENTS

Figure 1:
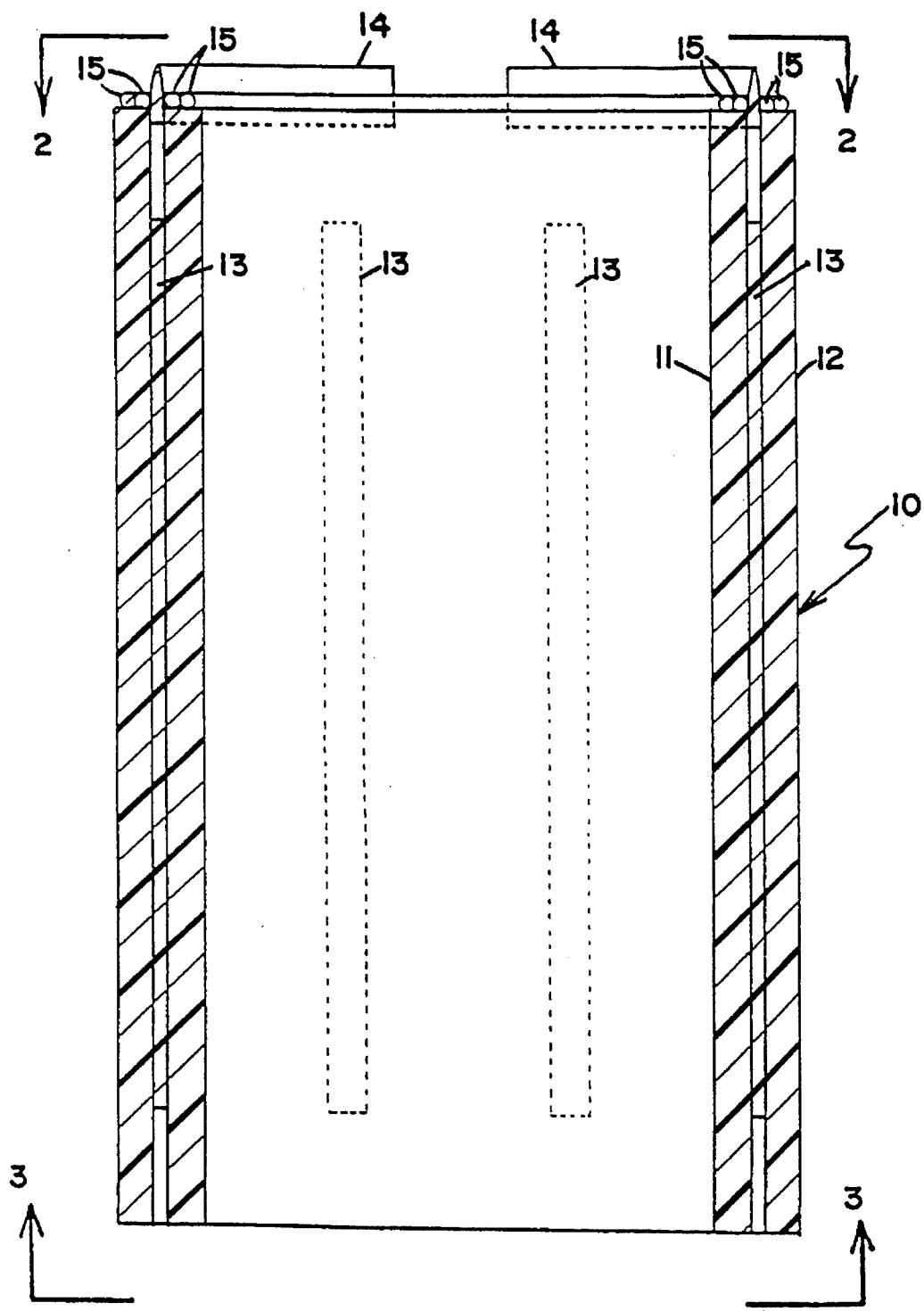
FIG. 1 is a longitudinal section of a module of secondary containment pipe for use in relining host pipes.

Referring to FIG. 1 there is illustrated a module 10 comprising a carrier pipe 11 and a containment pipe 12 which is concentrically aligned with the carrier pipe 11 by means of ribs 13. At one end of the section there is provided a circular spline 14 and positioned on either side of the spline 14 are rings of welding rod 15.

Figure 2:
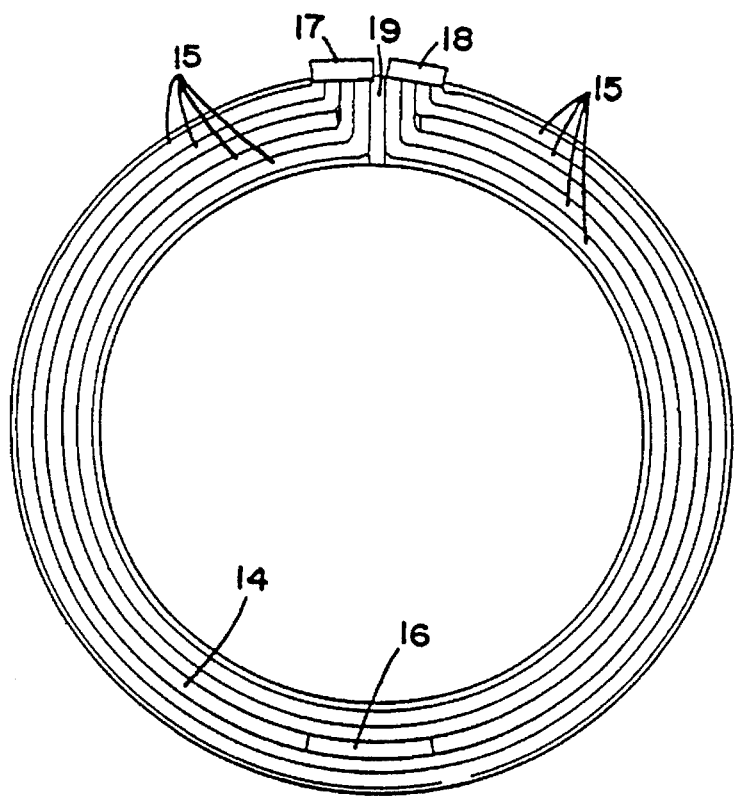
FIG. 2 is an end view on the line 2—2 of FIG. 1.

As shown in FIG. 2 the spline 14 is interrupted by a space 16 to provide a flow-through channel for leakage from the carrier pipe to migrate along the containment pipe and for the passage of leak detection equipment for detecting leakage from the carrier pipe. The ends of the welding rods 15 are terminated in electrical connectors 17 and 18 which are spaced apart by a suitable insulating member such as an HDPE rod 19.

Figure 3:
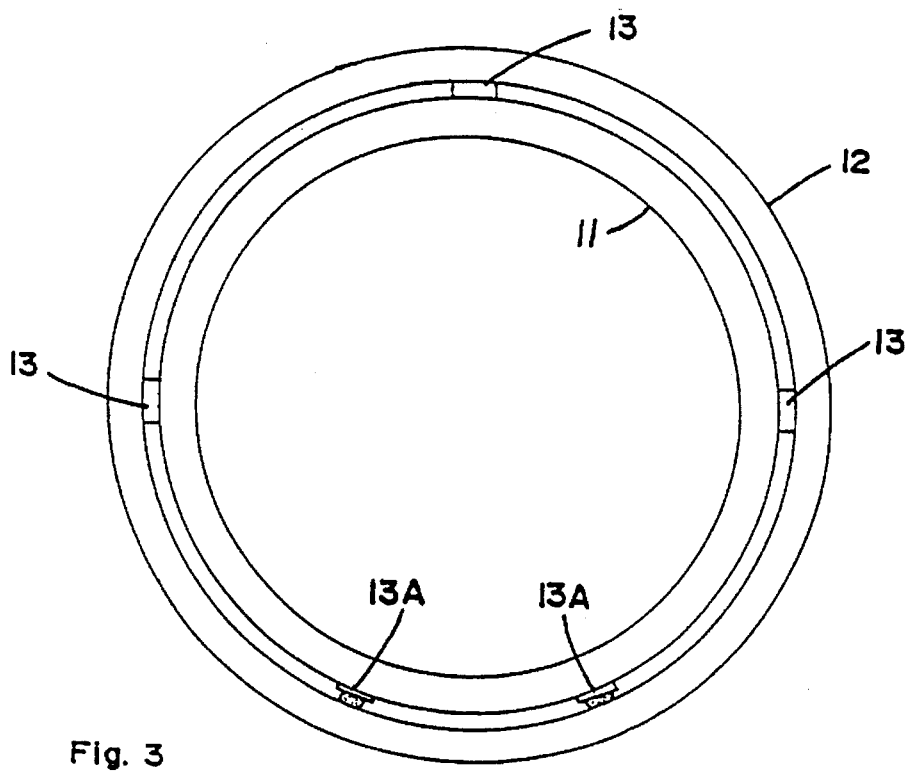
FIG. 3 is an end view on the line 3—3 of FIG. 1.

FIG. 3 illustrates the end of the module remote from the spline and illustrates a means for connecting the carrier pipe 11 and the containment pipe 12 by means of centering ribs 13 and welded ribs 13A. In the manufacture of the module, prior to the attachment of the spline 14 and the welding rods 15, the ends of the inner and outer pipes 11 and 12 would be faced on a pipe facing machine so that they are both lying in the same plane perpendicular to the longitudinal axis of the module. Subsequently the welding rod 15 and the spline 14 would be engaged with the one end of the module, the welding rod being fastened in place for example by a speed tip welder or the like, and the module when completed is then ready to be joined to a like module with the spline 15 inserted in the unsplined end of the adjacent section. Subsequently electrical connections are made to the connectors 17 and 18, and the welding rod 15 is heated to the fusion temperature while maintaining pressure on the modules to cause the pipe ends simultaneously to be joined to form a leak proof joint between adjacent sections of module.

With reference to FIG. 4, an alternative form of secondary containment pipe module is illustrated which consists of relatively long sections, for example 20 feet in length, of an inner carrier pipe 11 and an outer containment pipe 12 which are spaced apart by spiders 20 positioned at various positions along the length of the carrier pipe 11. The spiders 20 are joined to the carrier pipe 11 by suitable welding processes including the use of the welding rod as described in U.S. application Ser. No. 07/941,662 (U.S. Pat. No. 5,407, 514) or speed tip or other welding techniques.

A form of spider 20 is illustrated in FIG. 6 and consists of a flat annular ring with a plurality of holes spaced there through to permit flow of any leakage from the carrier pipe into the containment pipe. Preferably one of these holes 21 is located intersecting the outer perimeter of the annular ring 20 and such hole can be located at the lowest point of the annular ring to permit flow through the opening 21.

The annular ring 20 is illustrated in FIG. 5 with the welding rod 22 attached thereto for use of the ring as a means of simultaneously welding together four pipe ends to form a joint between adjacent modules of the secondary containment system. As illustrated in FIG. 5 this welding rod is a single length which communicates completely around the periphery of the ring and through suitable openings 23 and 24 and continues completely around the interior of the annular ring and back to the heat sink plug 25 for making electrical connection with the welding rod 22.

Figure 7:
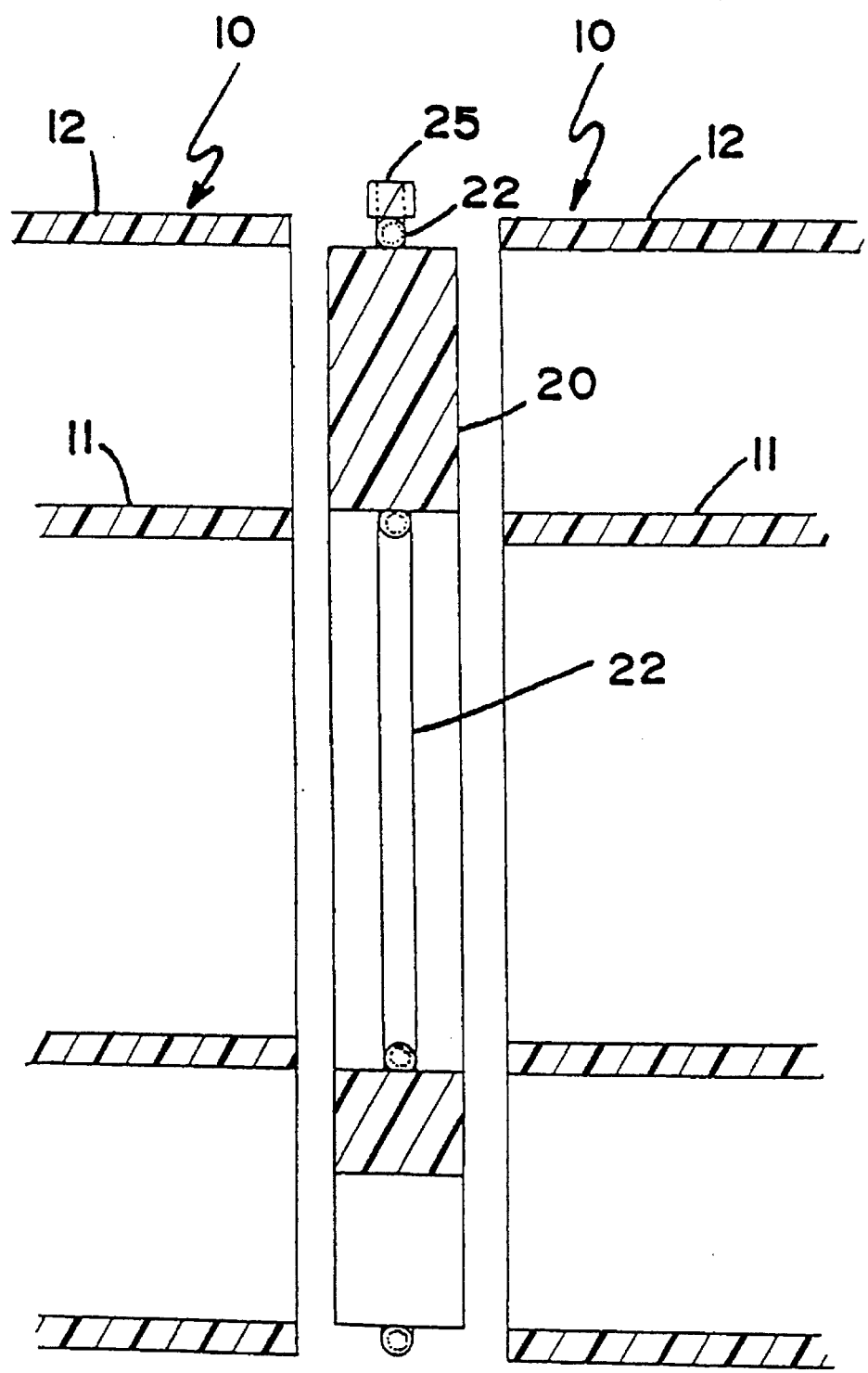
FIG. 7 is a longitudinal section through adjacent modules indicating the annular ring adapted to be inserted into the ends of each module to form a complete joint.

FIG. 7 is a cross section of the ends of two adjacent modules and the interposed annular ring 20. As may be noted in FIG. 7 the annular ring may have a thickness for example of approximately 1 inch where the carrier pipe 11 is a 4 inch diameter pipe and the containment pipe 12 is an 8 inch diameter pipe. When forming a weld, the ends of adjacent modules 10 are engaged with the annular ring 20 from opposite sides thereof with the ends of the carrier pipe members 11 abutting the inner portion of the welding rod 22 and the ends of the containment pipe 12 abutting the outer portion of the welding rod 22. The process for forming the weld comprises engaging the ends of the modules with the welding rod 22 on the annular ring 20, applying axial pressure on the modules while simultaneously applying an electrical current to the welding rod 22 through the connector 25. The current flowing through the welding rod 22 causes the rod to be fused with the ends of the adjacent modules, and by the continued application of pressure after the electrical current has been stopped, the ends of the adjacent modules are welded to the welding rod and to each other while being spaced accurately by the annular ring 20.

Figure 8:
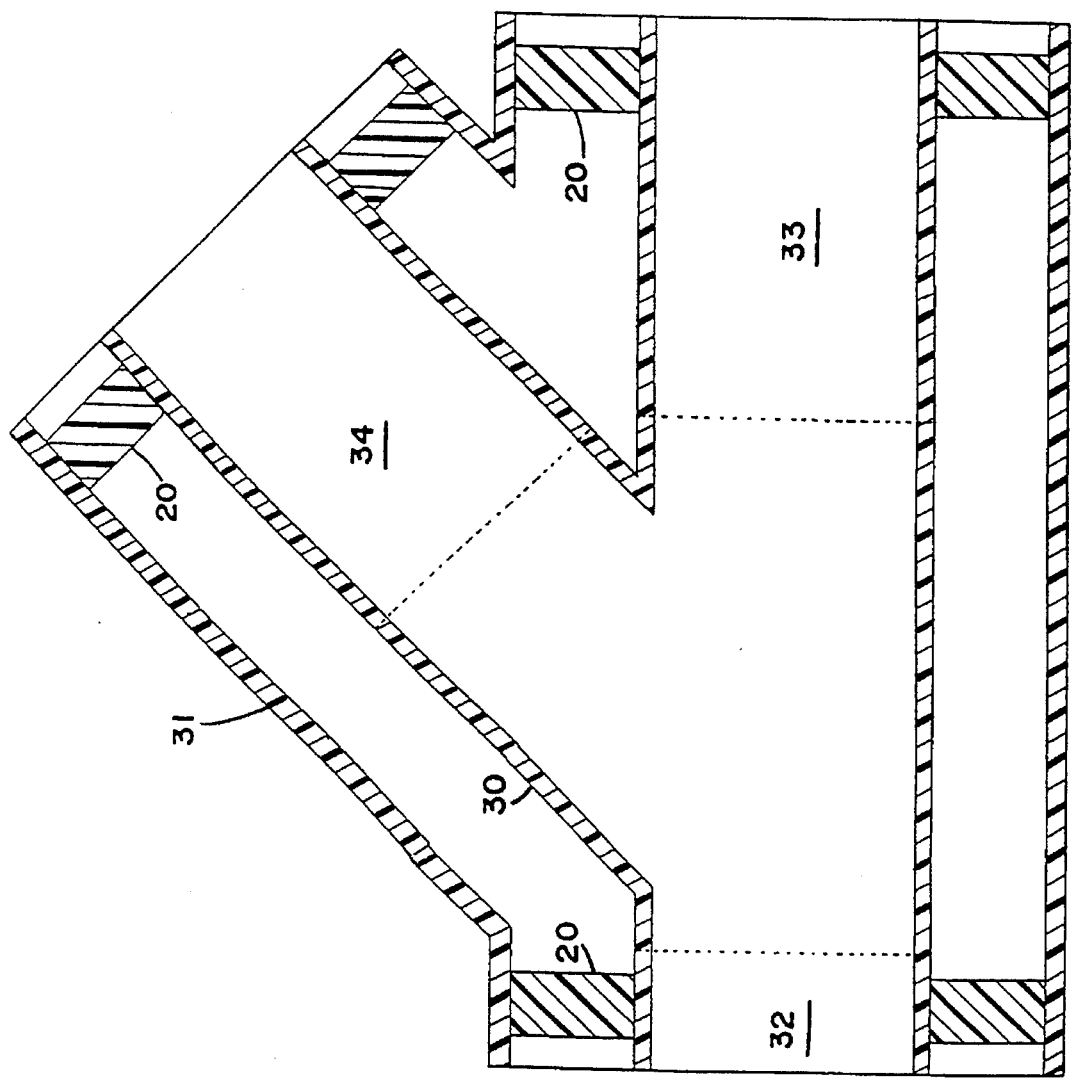
FIG. 8 is a longitudinal section of a wye fitting for use with the piping system of FIG. 7.

FIG. 8 illustrates a form of wye fitting for use in making piping connections in the secondary containment system. This fitting consists basically of a carrier wye 30 positioned within a containment wye 31. Since a standard wye fitting for the carrier pipe would be considerably smaller in all dimensions, additional pipe segments 32 and 33 and 34 would be welded to the wye 30 using fusion rings as taught in U.S. application 07/941,662 (U.S. Pat. No. 5,407,514), centring spiders 20 would be positioned between the carrier wye 30 and the containment wye 31 so that connections to adjacent piping modules from the wye fitting can be made as discussed above in relation to FIGS. 5 and 7. Other fittings such as elbows would be formed in a similar fashion.

FIG. 9 illustrates a transition fitting for making a pipe transition from the reline pipe module 40 to a DWV pipe module 41. As illustrated carrier pipe 41 of the reline module 40 is aligned within a containment pipe 42 of the module 40 and an opening 43 is provided through the carrier pipe 41 for connection to the module 44.

An opening 45 is provided through the containment pipe 42 concentric with the opening 43 and a carrier saddle 46 and a containment saddle 47 are welded to the carrier pipe 41 and the containment pipe 42 respectively. Telescopic pipe sections 48 and 49 are provided which can be aligned to form a flat face for connection to the DWV unit 44. The pipes 48 and 49 are welded together in appropriate alignment using fusion rings 50 to form a coaxial connection to the DWV unit 44 using a fusion spider 51. Clearly the fusion spider 51 of FIG. 9 would have the same construction as the spider 20 of FIG. 7 and would perform the same function. Thus a transition is provided permitting a lateral connection of the second type of DWV module to the first or reline module. It is anticipated that the reline module would be used for the relining of host sewers which require relining with secondary containment, and the transition to the DWV module 44 would be used for connection to separate DWV systems.

FIG. 10 illustrates a weld between adjacent module sections in accordance with the teachings of FIG. 1, illustrating a means for the compressing of the welding rod 15 during the welding operation and further illustrates a means for pressure testing the weld on completion. A suitable form of bladder 60 is inserted within the carrier pipe 11 centred on the weld, and separate bladders 61 and 62 of annular shape are provided on opposite sides of the weld. Bladders 60, 61 62, and 63 are component parts of a four bladder packer. Bladder 60 is inflated while a weld is being made, and ensures that the interior of the weld is smooth and conforms to the adjacent pipe walls, to form a beadless weld. Bladders 61 and 62 may be inflated for pressure testing a weld, in accordance with well known pressure testing techniques. Bladder 63 is connected to the body of the packer by a pneumatic cylinder (not shown). Bladder 63 is inflated after the packer has been inserted in the pipe module, and bladder 60 has been aligned with the joint between adjacent modules. Bladder 62 is inflated, and the pneumatic cylinder is contracted to cause axial compression on the weld. Electric current is applied to the welding rod 15, via connector 64 and the weld is formed under compression. As the electric current is stopped, bladder is inflated to ensure that a bead does not form in the interior of the carrier pipe of the modules 10.

After pressure testing, the packer may be repositioned to form another weld with a new module 10, and the modules 10 which have been welded together are pushed into the host pipe, and the next module added to the reline pipe.

As illustrated in FIG. 10, all of the operations for relining a host pipe may be carried out in a manhole 70 of an existing sewer system.

The system of the present invention is designed for modular sewer relining as well as for the construction of new drain waste vent plumbing. The sewer relining module would be typically a 3 foot length, with the carrier pipe 11 concentric inside the containment pipe 12 by use of appropriate ribs 13 and 13A FIG. 3, which are welded along the outside of the carrier pipe. These ribs 13 would start and stop 3 inches from the ends of the module. This spacing is left to allow leaking fluid to drop down to the bottom of the pipe and it also allows for the insertion of the spline 14 used to align the pipes for welding. Two or more of these ribs may be modified as shown at 13A to include including welding rod which will be used to physically weld the carrier pipe to the containment pipe. This may be done to ensure that the two pipes are in fact one module so that during butt welding of adjacent modules the pressure will be applied to both pipes equally, and by welding the carrier pipe 11 to the containment pipe 12 the problems associated with thermal expansion are greatly reduced. When the module has been assembled, the pipe ends 11 and 12 are squared up in a pipe facing machine. This is done to assure a better quality pipe fit and joint when the pipes are welded in the field. The spline 14 may be made for example from 200 mil one inch wide polyethylene and is fitted into the slot between the carrier and containment pipes on one end of the module 10. The spline 14 does not fit all the way around the pipe, instead a 3 inch gap 16 is left between the two ends of the spline at the bottom of the pipe to allow leaking product to migrate through the joint. The leading edge of the spline 14 is also tapered to make field fitting of the spline into the preceding pipe easier.

At the top of the spline a channel may be cut flush with the pipe faces wide enough to fit 4 strands of the welding rod and a 5th spacer of HDPE to electrically insulate the ends of the welding rods. As illustrated in FIG. 1, four individual lengths of welding rod are tack welded onto the ends of the pipes, two on the carrier pipe 11 and two on the containment pipe 12. All 8 ends of the welding rod are stripped and formed into 2 sets of 4 wires each which are fitted with electrical connectors. The module is then complete and ready for shipping to an installation site.

The DWV module uses a modified centring spider with the welding rod pre-attached in such a way that it is possible to weld both pipes of a double walled piping system at the same time. This is a major improvement over existing technology which only allows one pipe at a time to be welded. This system of modules is particularly useful in connecting to fittings of a piping system as discussed above.

Innovations in this system include the ability to preassemble lengths of pipe and double walled fittings to pressure test both inner and outer welds, to connect a double walled piping system to a double walled sewer relining system, and the ability to weld the centring spiders to both the inner and outer pipes. The DWV system includes the following advantages:

The pipe used is HDPE which is more chemically inert than most other piping materials. Thin walled pipe may be used which is less expensive and has a larger pipe inside diameter than thicker walled pipe.

The inner carrier pipe 11 must be centred in the outer pipe with spiders that allow liquid to flow through the containment pipe uninterrupted and carry cables for a leak detection system.

No internal beads in either the carrier or containment pipe are created during the welding process.

Beads in the carrier pipe interfere with the flow of fluid therethrough and cleaning pigs used to remove build up in the pipes.

Beads in the outer carrier pipe create dams for leaking fluids which have to be removed when the leak is repaired. The spiders at the fittings assist in countering the forces built up by the expansion of the pipe due to the high effluent temperatures.

The fittings are designed without mitred joints and incorporate long sweeps in the elbows meaning that there are no sudden changes in direction.

The system is readily installed in the field with a minimum of complexity and difficulty.

As long as the prefabricated modules of double walled pipe are faced with square ends, installation in the field is very readily completed.

It should be noted that specially designed equipment can made that allows both the carrier pipe and the containment pipe welds to be pressure tested. Failure to pass a pressure test utilizing this system merely requires the reheating of the weld while putting more pressure on the joint being heated.

The fabrication of the components of a secondary containment DWV system requires that 4 basic components be prefabricated. These are the double walled pipe module, the spider fusion ring, the double walled fittings and the telescopic saddles.

The double walled pipe is illustrated in FIG. 4 and as shown has 5 spiders 20 slipped over the carrier pipe 11 and positioned as shown in FIG. 4. These spiders are held in place, for example, by speed tip welds. If the spiders 20 are to be welded to the outer containment pipe 12 as well, the top of each spider may be trimmed and a length of welding rod preattached to the trimmed area. The containment pipe may then be slipped over the spider and the welds to the containment pipe made using a radio frequency welding shoe. This procedure causes the welding rod to heat up and form a weld between the spider and the containment pipe. It is not required to weld all the spiders to the containment pipe then only the two outer spiders require welding for example using a speed tip welding gun. It is of course important that both pipes at each end of the module have coplanar faces, and this can be readily accomplished using a pipe facing machine of standard design.

The fusion ring 20 as illustrated in FIG. 5 is the same ring as would be used for a spider, and gives a much stronger reinforced joint. Two holes are drilled through the body of the spider as illustrated in FIG. 5 to take the welding rod from the outer to the inner ring. At the top of the spider 20 a special heat sink plug is used for connecting to the welding rod. It should be noted that by using this form of welding spider the pipe which might be out of round will be forced back into round as the elements of the joint are assembled.

The double walled fittings for example the wye fitting of FIG. 8 may readily be prefabricated for easier field installation and this is a major improvement to piping industry. The carrier fitting 30 is much smaller than the containment fitting 31 and is designed to be inserted in the containment fitting 31. The ends of the carrier fitting 30 must be lengthened so that they form a flush end with the containment fitting 31 and spiders 20 are used at the ends of the double wall fittings to both centre the inner fitting and to strengthen the fitting against the forces due to thermal expansion.

The telescopic saddle of FIG. 9 is assembled of readily available components welded in place using telescopic connections to make the joint following which the telescopic pipes 50 are faced so that the fusion spider 51 may be inserted in the ends of the pipe and a DWV module 44 joined thereto.

Figure 12:
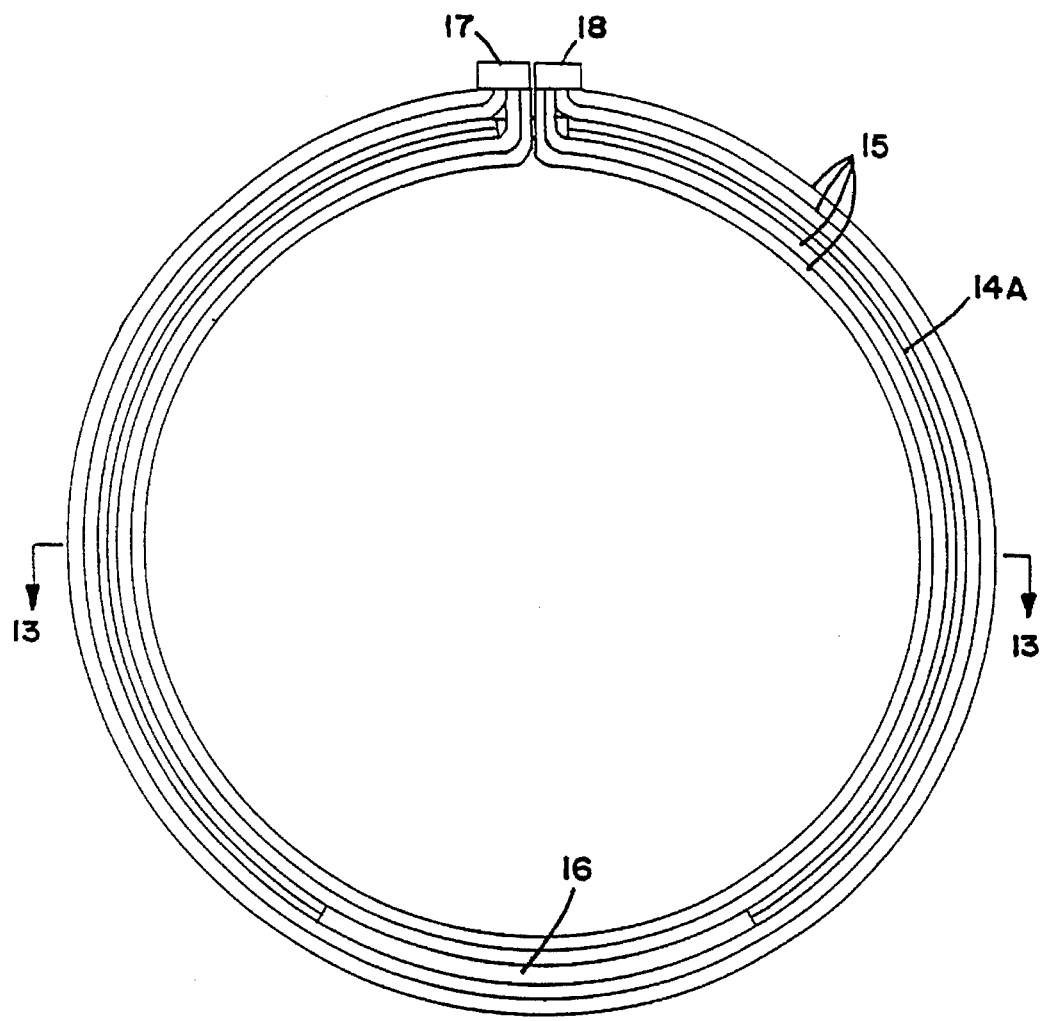
FIG. 12 is a front elevation of a spline for use in welding modules.
Figure 13:
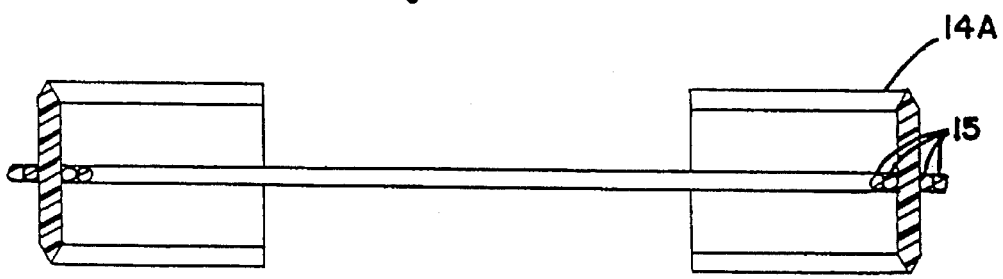
FIG. 13 is a section on the line 13—13 of FIG. 12.

FIGS. 12 and 13 illustrate a double sided spline 14A intended for making welds between modules of the sewer reliner of FIG. 1. This spline 14A is provided with internal and external lengths of welding rod. In use, the spline is inserted into the open ends of adjacent modules, and electric current is applied to the welding rod 15, while pressure is maintained urging the modules together and simultaneous welds of the carrier and containment pipes are made.

We claim:

1. A thermoplastic secondary containment piping system comprising:

a plurality of modules adapted to be joined together end-to-end, each module comprising an inner carrier pipe of a thermoplastic material, an outer containment pipe of said thermoplastic material, each of said pipes having a pair of ends, means for holding said carrier pipe concentrically in said containment pipe, said holding means having openings therein for passage of leaking fluid and leak detection means therethrough, the ends of said carrier and containment pipes of said module being perpendicular to a lengthwise axis of said pipes, and each end of said module having the ends of the carrier pipe and the containment pipe coplanar with each other;

a tubular insert comprising said thermoplastic material and having an inner diameter slightly larger than an outer diameter of said carrier pipe, and an outer diameter slightly smaller than an inner diameter of said containment pipe, said insert being engageable with said modules by insertion between said carrier and containment pipes; and a pair of inner and outer welding members each comprising a flexible rod of said thermoplastic material having an electrical winding embedded in a surface of said rod, said winding when energized by an electric current providing thermal energy effective to melt and fuse the thermoplastic of said rod, said insert and adjacent portions of said modules, said welding members being positionable to simultaneously contact said insert, a pair of adjacent ends of said carrier pipes, and a pair of adjacent ends of said containment pipes of adjacent modules, whereby like pipe sections may be joined by simultaneously welding the carrier pipe and containment pipe of one module to said insert and to the corresponding pipes of said adjacent module, said tubular insert becoming an integral part of the weld and joining all four pipe ends together at the same time.

2. A secondary containment piping system as claimed in claim 1, wherein said thermoplastic material is polyethylene.

3. A secondary containment system as claimed in claim 2, wherein said polyethylene is high density polyethylene.

4. A secondary containment system as claimed in claim 1, wherein said insert comprises a tube having a pair of end faces at opposite ends thereof, an internal diameter configured to receive an outer surface of said carrier pipe in a sliding fit, and an outer diameter to receive an inner surface of said containment pipe in a sliding fit, said welding members being affixed to inner and outer peripheral surfaces of said tube intermediate the end faces thereof to engage the corresponding ends of the adjacent pipe sections, whereby welding of said modules is enabled.

5. A secondary containment system as claimed in claim 1, wherein said insert is formed from a flat strip of high density polyethylene curved into a tube of a thickness that fits between said carrier and containment pipes.

6. A secondary containment system as claimed in claim 1, wherein said insert has a passage extending therethrough for permitting leaking fluid between said carrier and containment pipes to flow from one module to another.

7. A secondary containment system as claimed in claim 6, wherein said thermoplastic material is high density polyethylene.

8. A secondary containment system as claimed in claim 6, wherein said thermoplastic welding rods form rings disposed in aligned positions on opposite sides of said tubular insert, the inner welding member being preattached to the inner periphery of the insert, and the outer welding member being preattached to the outer periphery of the insert concentrically with the inner welding member.

9. A secondary containment system as claimed in claim 4, wherein said end faces of said insert are flat.

10. A secondary containment system as claimed in claim 4, wherein at least one of said end faces of said insert tapers to form a spline.

11. A secondary containment system as claimed in claim 1, wherein said holding means comprises a plurality of spaced ribs formed on an outer peripheral surface of the inner containment pipe.

12. A secondary containment system as claimed in claim 11, wherein said ribs extend in the lengthwise direction of the module and end at positions spaced from the ends of the module.

* * * * *